(12) United States Patent
Eluard

(10) Patent No.: US 9,222,522 B2
(45) Date of Patent: Dec. 29, 2015

(54) COUPLING DEVICE BETWEEN TWO ROTARY ELEMENTS

(71) Applicant: MESSIER-BUGATTI-DOWTY, Velizy-Villacoublay (FR)

(72) Inventor: Gilles Eluard, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 35 days.

(21) Appl. No.: 13/850,702

(22) Filed: Mar. 26, 2013

(65) Prior Publication Data

US 2013/0256079 A1   Oct. 3, 2013

(30) Foreign Application Priority Data

Mar. 28, 2012  (FR) ...................................... 12 52806

(51) Int. Cl.
| | | |
|---|---|---|
| F16D 11/10 | (2006.01) | |
| F16D 27/118 | (2006.01) | |
| F16D 11/14 | (2006.01) | |
| F16D 27/10 | (2006.01) | |

(52) U.S. Cl.
CPC ................ *F16D 11/14* (2013.01); *F16D 11/10* (2013.01); *F16D 27/10* (2013.01); *F16D 27/118* (2013.01)

(58) Field of Classification Search
CPC ................................................ F16D 2011/008
USPC ............. 192/69.5, 67 R, 108, 66.3, 69, 69.6, 192/69.61; 74/461
See application file for complete search history.

(56) References Cited

U.S. PATENT DOCUMENTS

| | | | | |
|---|---|---|---|---|
| 612,814 | A | * 10/1898 | Gleason | ......................... 280/100 |
| 900,578 | A | * 10/1908 | Nichols | ........................ 192/69.5 |
| 1,642,907 | A | 9/1927 | Sundh | |
| 1,748,146 | A | 2/1930 | Ricefield | |
| 1,933,072 | A | 10/1933 | Ricefield | |
| 2,003,166 | A | * 5/1935 | Zancan | ......................... 180/6.34 |
| 2,050,910 | A | * 8/1936 | Zancan | ........................ 192/69.5 |
| 2,236,101 | A | * 3/1941 | Kirkland | ...................... 192/69.5 |
| 3,539,044 | A | * 11/1970 | Grimstad | ..................... 192/69.5 |
| 4,184,380 | A | * 1/1980 | Rivin | ............................... 74/461 |
| 4,344,515 | A | 8/1982 | Grote et al. | |
| 4,944,196 | A | * 7/1990 | Rivin | ............................... 74/443 |
| 2011/0011693 | A1 | * 1/2011 | Dugas | ............................ 192/45 |

FOREIGN PATENT DOCUMENTS

| | | |
|---|---|---|
| DE | 25 48 803 A1 | 5/1977 |
| FR | 1 367 974 A | 7/1964 |
| FR | 2 453 314 A1 | 10/1980 |

* cited by examiner

*Primary Examiner* — Rodney H Bonck
*Assistant Examiner* — Stacey Fluhart
(74) *Attorney, Agent, or Firm* — Sughrue Mion, PLLC

(57) ABSTRACT

A device for coupling together two elements mounted to rotate about a common axis of rotation (X) in order to enable one of the elements to be selectively driven in rotation by the other. There are two members (3, 4), one per element, the elements being axially movable relative to each other between a remote decoupled position and an engaged position in which the members provide a rotary connection between the two elements. One of the members forms a plate (3) having a face (P) perpendicular to the axis of rotation and in which a plurality of housings (15) are formed. The other one of the elements carrying rollers (23) that are mounted to rotate about radial axes to project from said element so that each of them can penetrate into any one of the housings and provide a rotary connection between the two members.

3 Claims, 2 Drawing Sheets

COUPLING DEVICE BETWEEN TWO ROTARY ELEMENTS

The invention relates to a coupling device between two shafts or two rotary elements about a common axis of rotation in order to enable one of the elements to be driven selectively in rotation by the other.

TECHNOLOGICAL BACKGROUND OF THE INVENTION

Coupler devices are known that comprise two members, each secured to one of the elements for coupling together. The members are axially movable relative to each other between a remote position in which the members do not co-operate and the elements are decoupled, and an engaged position in which the members co-operate with each other in order to provide a rotary connection between the two elements.

The invention relates more particularly to coupling by means of obstacles, in which projecting portions from one of the members are received in facing recesses in the other member when they are mutually engaged. A known coupling of that type is a dog clutch. Nevertheless, such couplings generally require a relative speed of rotation between the two members that is zero or small in order to enable projecting portions to penetrate into recessed portions. It is therefore necessary to begin specifically by synchronizing the speeds of the two elements. It is sometimes possible to omit such synchronization, but at the expense of high levels of engagement noise, and at the risk of the members becoming damaged.

OBJECT OF THE INVENTION

An object of the invention is to provide a coupling device of the obstacle type that is tolerant of such a lack of synchronization.

SUMMARY OF THE INVENTION

In order to achieve this object, the invention proposes a device for coupling together two elements mounted to rotate about a common axis of rotation in order to enable one of the elements to be selectively driven in rotation by the other, the device comprising two members, each secured to a respective one of the elements, the elements being axially movable relative to each other between a remote position in which the members do not co-operate and the elements are decoupled, and an engaged position in which the members co-operate with each other in order to provide a rotary connection between the two elements. According to the invention, one of the members forms a plate having a face perpendicular to the axis of rotation and in which a plurality of housings are formed, the housings extending in radial directions; the other one of the members carrying rollers that are mounted to rotate about radial axes to project from said element so that each of them can penetrate into any one of the housings when the members are engaged and can co-operate with the side faces of the housing in order to provide a rotary connection between the two members.

Thus, when the two elements move towards each other, if the rollers are not in register with the housings, they come into abutment against the facing faces of the plate, but can then roll on the plate until they drop into the housings. They then form obstacles that communicate rotary motion from the element to which they are connected to the other member by bearing against the faces of the housings. There is thus no need to provide accurate synchronization. It suffices to ensure that the two members are rotating at speeds that are not too far apart in order to enable the rollers to enter into the housings.

The invention can be better understood in the light of the following detailed description of a particular embodiment of the invention.

DESCRIPTION OF THE FIGURES

The invention is described in detail with reference to the accompanying drawings, in which.

DETAILED DESCRIPTION OF A PARTICULAR EMBODIMENT

Figure 1:
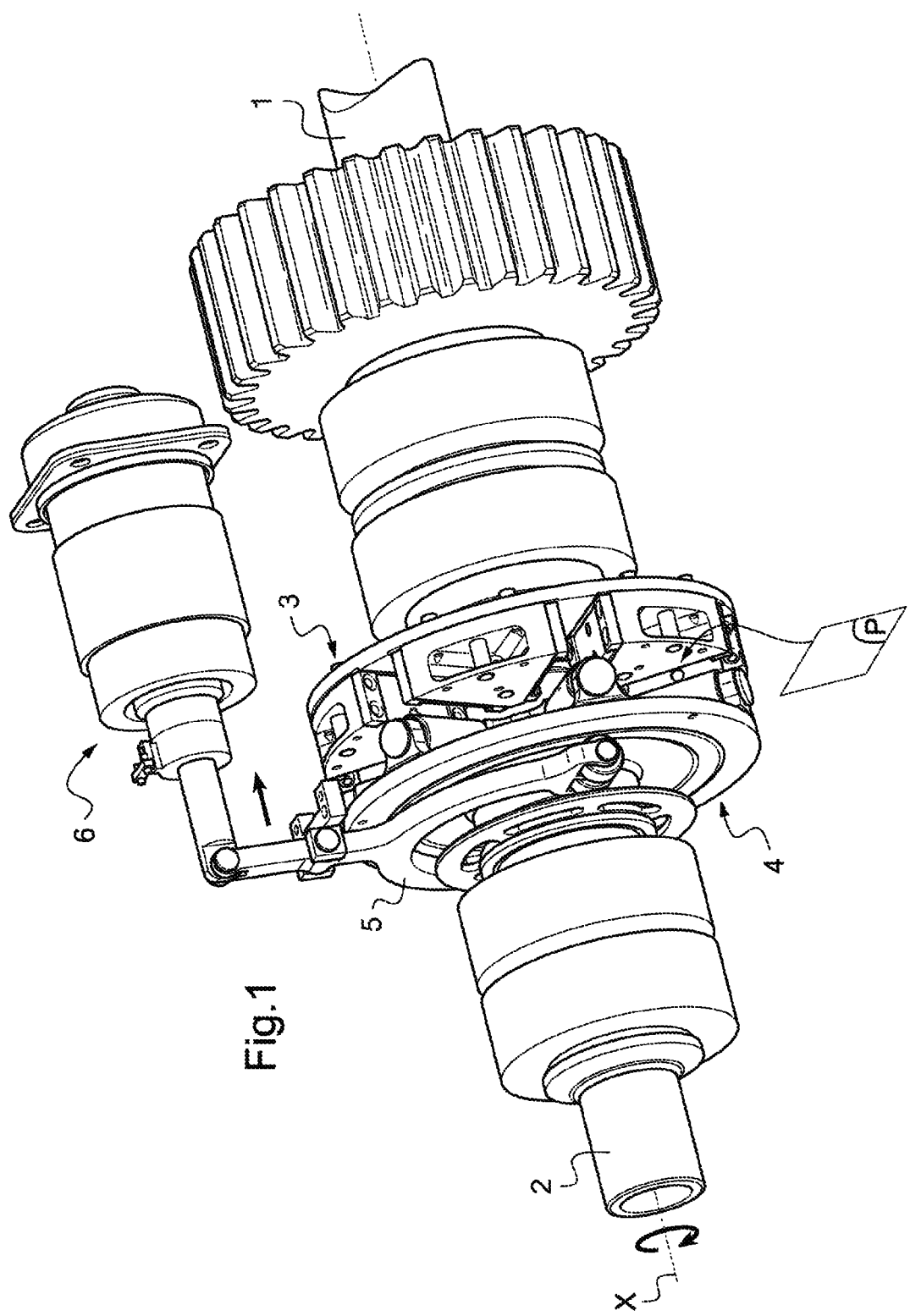
FIG. 1 is a perspective view of the device of the invention in a particular embodiment, the device being in its remote position.

The device of the invention is for selectively coupling together two shafts 1 and 2 that are mounted to rotate on the same axis of rotation X. In this example, the shaft 1 is secured to a gearwheel, while the shaft 2 is secured to a motor.

The device of the invention essentially comprises two members, one being a plate 3 and the other being a roller carrier 4, that are constrained to rotate respectively with the shafts 1 and 2. In this example, the roller carrier 4 is mounted on the shaft 2 via fluting (not shown) that allows it to move axially under drive from a fork 5, the fork being moved by an actuator 6.

Figure 2:
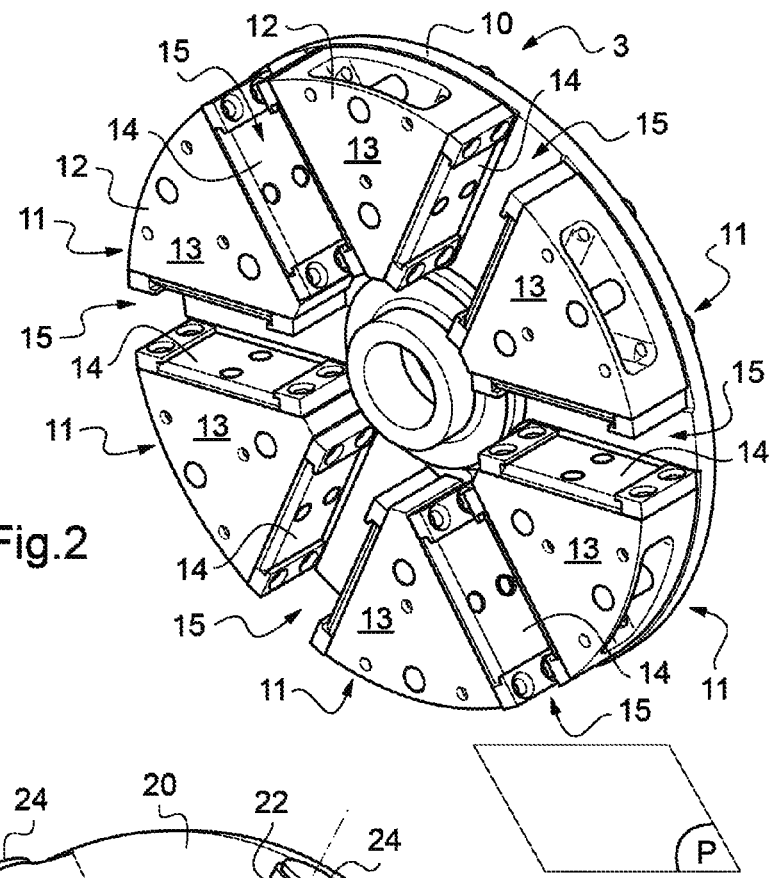
FIG. 2 is a face view of the member of the FIG. 1 device that carries the plate having housings.

As can be seen in FIG. 2, the plate 3 comprises a disk 10 having sectors 11 fastened thereon, this example having six sectors that are regularly spaced apart. Each of the sectors 11 has a cage 12 that is fitted on the disk 10 and that presents a front face 13 facing towards the roller carrier 4, which front face is coplanar with the other front faces of the other sectors 11, so that together they define a plane surface P perpendicular are to the axis X. The cages 12 have flanks that are fitted with removable pads 14, such that two facing removable pads 14 of two adjacent cages 12 define between them a housing 15, with both of the parallel faces of the housing extending in directions that are parallel to a radial direction. The removable pads 14 then form the side faces of the housings 15.

Figure 3:
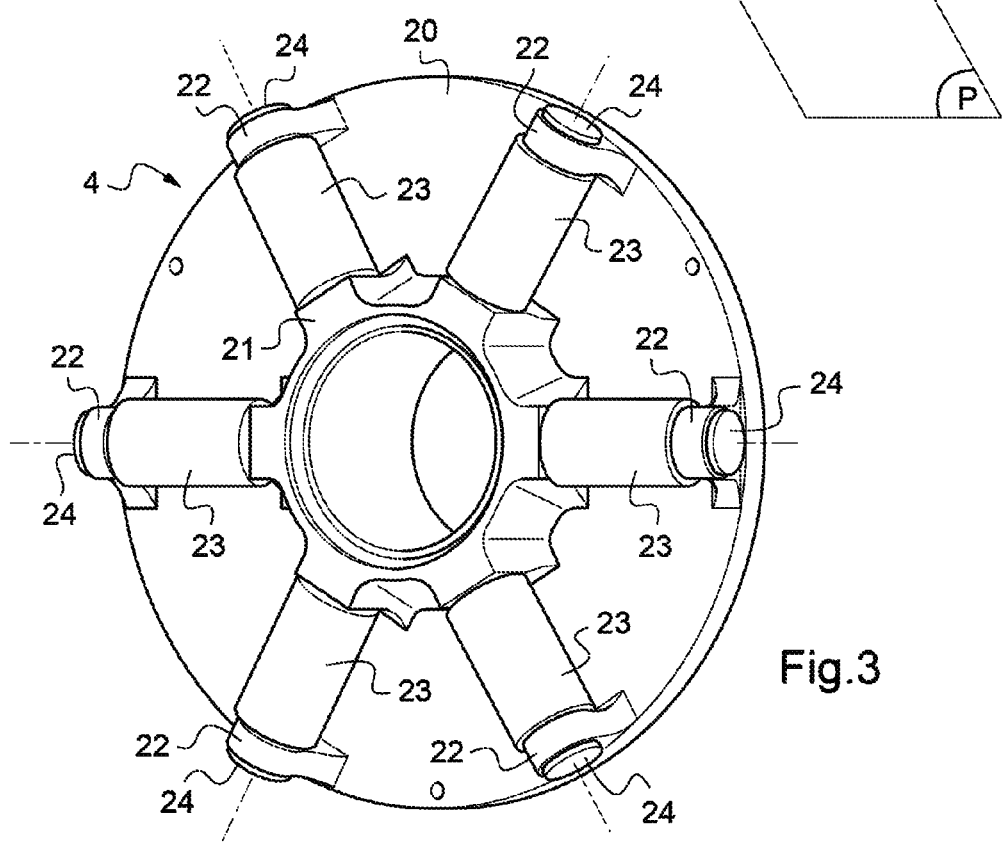
FIG. 3 is a face view of the member of the FIG. 1 device that carries the rollers.

As can be seen in FIG. 3, the roller carrier 4 comprises a disk 20 associated with a central hub 21 having six orifices that are regularly spaced apart and pierced in radial directions (the orifices are not themselves visible). The disk 20 also has six bearings 22 arranged at the periphery of the disk 20 so as to be in alignment with respective ones of the orifices in the central hub. Rollers 23 are mounted to rotate on spindles 24 (of which only the projecting heads can be seen), e.g. each engaged in one of the orifices in the central hub 21 and in one of the bearings 22. Thus, the rollers 23 are carried by the roller carrier 4 so as to be rotatable about radial axes. The rollers 23 are thus carried projecting from the disk 20.

With reference to FIG. 1, it can be seen that the plate 3 and the roller carrier 4 are shown in their remote position. It is desired to couple the shaft 2 and the shaft 1 in rotation in order to enable the motor to impart rotary drive to the gearwheel. For this purpose, the actuator 6 is operated to move the roller carrier 4 closer to the plate 3. The actuator drives the fork 5, thereby forcing the roller carrier 4 to move closer to the plate 3 (along the arrow in FIG. 1), until the rollers 23 come to bear against the plane surface P of the plate 3. It is very likely that the rollers 23 are then not in register with the housings 15. Nevertheless, because of the different speeds of rotation of the two members, the rollers 23 will roll on the plane surface P until they drop into the facing housings 15. The axial movement of the roller carrier 4 then continues under drive from the actuator 6 until the rollers 23 are fully engaged in the housings 15. The rollers 23 then bear against one of the facing pads 14 in order to drive the plate 3 in rotation. There is thus no need for accurate synchronization between the speeds of rotation of the two members.

For decoupling purposes, it suffices to reverse the roller carrier 4 axially by controlling the actuator 6 to operate in the opposite direction until the rollers 23 are disengaged from the housings 15.

According to a particular aspect of the invention, the pads 14 are made of a damping material suitable for absorbing the jolts in transmission between the roller carrier 4 and the plate 3.

Advantageously, an axial abutment member is provided that is arranged between the roller carrier 4 and the plate 3 in order to stop these two elements axially when the rollers 23 have penetrated into the housings 15. In a particular embodiment, the axial abutment member comprises pads similar to the pads 14, and arranged at the bottoms of the housings 15 so that the rollers come to bear against these bottom pads.

The invention is not limited to the above description, but covers any variant coming within the ambit defined by the claims.

In particular, although the relative axial movement of two members is provided in this example by an actuator 6 acting on a fork 5, any other means for obtaining relative axial movement could be envisaged in the context of the invention, e.g. such as movement under drive from a hydraulic pusher.

Furthermore, although the plate in this example is constituted by a disk having sectors fitted thereon, any other fabrication technique could be envisaged, providing the plate presents a plane surface against which the rollers can press, with housings into which the rollers can be engaged.

The invention claimed is:

1. A device for coupling together first and second elements mounted to rotate about a common axis of rotation in order to enable the first element to be selectively driven in rotation by the second element, the device comprising:
    two disk-shaped members, each member being secured to a respective one of the first and second elements for coupling together, the first and second elements being axially movable relative to each other between a remote position in which the members do not co-operate and the first and second elements are decoupled, and an engaged position in which the members co-operate with each other in order to provide a rotary connection between the first and second elements,
    wherein one of the members forms a plate having a face perpendicular to the axis of rotation and in which a plurality of housings are formed, the housings extending in radial directions from the axis of rotation to a circumferential surface of the plate and forming substantially U-shaped cavities;
    wherein the second element carries cylindrically-shaped rollers that are mounted to rotate about radial axes to project from said second element so that the rollers can roll on the face until said cylindrically-shaped rollers penetrate into any one of the housings when the members are engaged and can co-operate with side faces of one of said housings in order to provide a rotary connection between the two members.

2. A device according to claim 1, wherein the plate comprises a disk that receives regularly spaced apart sectors, the sectors having flanks that receive removable pads such that two facing removable pads carried by two adjacent sectors define the side faces of a housing.

3. A device according to claim 2, wherein the pads are made of a damper material suitable for absorbing jolts in transmission between the two members.

* * * * *